July 1, 1930. Q. A. BRACKETT 1,768,660
HOT CATHODE CONVERTER
Original Filed Dec. 31, 1918
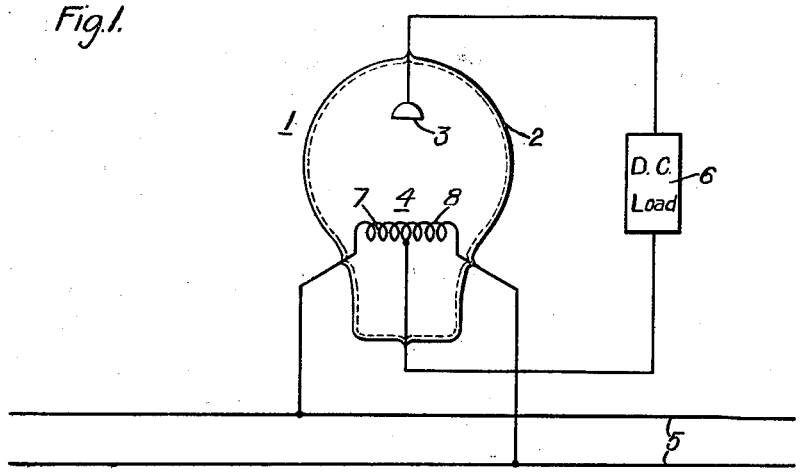
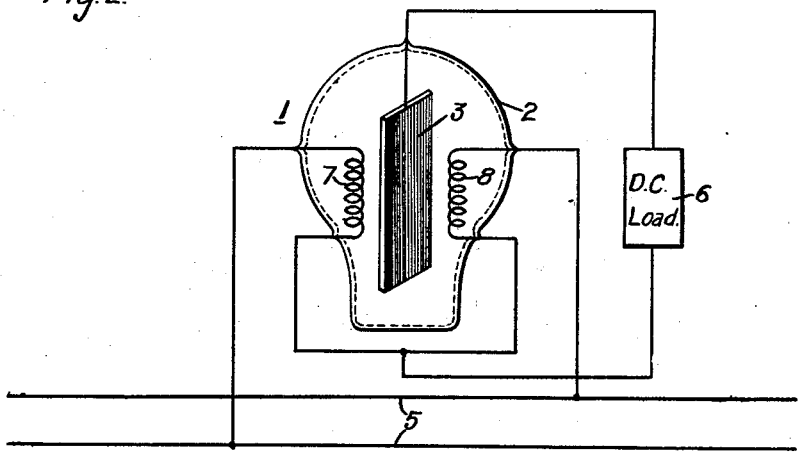
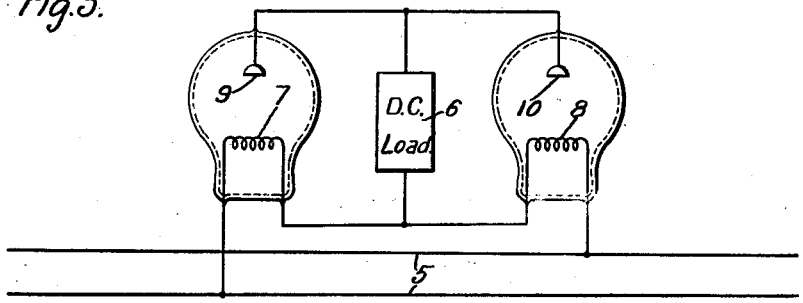
WITNESSES:
J. A. Helsel
A. A. Brand
INVENTOR
Quincy A. Brackett.
BY
ATTORNEY Patented July 1, 1930

1,768,660

UNITED STATES PATENT OFFICE

QUINCY A. BRACKETT, OF CHICOPEE FALLS, MASSACHUSETTS, ASSIGNOR TO WESTINGHOUSE ELECTRIC AND MANUFACTURING COMPANY, A CORPORATION OF PENNSYLVANIA

HOT-CATHODE CONVERTER

Application filed December 31, 1918, Serial No. 269,089. Renewed May 17, 1928.

My invention relates to alternating-current rectifiers, having particular relation to rectifiers in which the cathode member comprises an electron emitting filamentary electrode, and it has for its object to provide a rectifier of the designated type in which the aforesaid filamentary member is so connected to the alternating-current supply-circuit which supplies the rectifier that an artificial neutral point is established.

A further object of my invention is to provide a rectifier of the character designated which shall contain a single anode, but which shall rectify both half-waves of the potential impressed thereupon and which shall, moreover, in its construction and operation, eliminate entirely the transformers, reactances, sustaining coils, and other auxiliary apparatus which are usually associated with alternating-current rectifiers.

I propose, therefore, to construct an alternating-current rectifier of the electron-emitting, filamentary-cathode type in which the cathode shall be connected across the alternating-current source of supply, or a portion thereof, and in which the direct-current load fed thereby shall have one of its terminals connected to a point intermediate the ends of the filament, the other terminal of said direct-current load being, connected to the anode member of the rectifier, as usual.

The direct-current is caused to flow through the load and the rectifier by the potential drop across alternating halves of the filamentary cathode. In this connection, it will be observed that the bulb, which constitutes the containing structure for the anode and cathode members, may contain inert gases, of such amount and density as the desired operating characteristics may require, as is well known in the art, or the containing bulb may be maintained in a highly evacuated state for high-voltage operation.

Furthermore, the point on the filamentary cathode at which the artificial neutral is established may be varied in accordance with the operating characteristics which it is desired to obtain. For example, if it is desired to rectify only one half-wave of the alternating current, it is obvious that the artificial neutral may be established very near to, or immediately at, the end of the filamentary cathode. In this manner, the rectified current produced by one half-wave is increased and that produced by the other half wave is decreased or caused to completely disappear. Therefore, while the mid-point connection will generally be preferred, it is desirable, under some circumstances, that the artificial neutral be displaced therefrom, since such a connection will provide for a higher direct-current voltage without the interposition of a transformer to effect a change in line voltage.

For a better understanding of my invention, reference may be had to the accompanying drawing in which: Fig. 1 illustrates, diagrammatically, an embodiment of my invention in which the portions into which the filamentary cathode is divided by the establishment of an artificial neutral point, are integral with each other; Fig. 2 is a similar view of a modification of the system, in which the two portions of the filamentary cathode are separated, within the containing bulb, by a shielding anode member; and Fig. 3 is a similar view of a modification of the system, in which separate containing structures are provided for the two portions of the cathode member.

Referring more particularly to Fig. 1 of the drawing, a rectifier 1, comprising a containing bulb 2 in which are positioned an anode member 3 and a filamentary cathode member 4, is shown. An alternating-current source of power, here represented by mains 5, is connected across the entire length of the cathode 4 and, therefore, if the cathode 4 is of resistive material, it will be heated by the passage of current therethrough and will subsequently emit ions. A direct-current load 6 is connected between the anode member 3 and a point intermediate the ends of the filament 4. In this figure, I have shown this latter connection as existing at a point midway between the ends of the filament 4 but it will be understood, of course, that this point may be established at any position intermediate the two ends of the filament.

In Fig. 2, the anode member 3 is of the plate type and is arranged to extend intermediate the two portions 7 and 8 into which the filamentary cathode is divided by the establishment of a neutral point thereupon. This construction may be desirable in some circumstances, the details of which will be hereinafter described.

In Fig. 3, I have illustrated my invention as embodied in a system having separate containing bulbs for the two portions of the filamentary cathode. In the system shown in this figure, it will, of course, be necessary to provide two anodes, 9 and 10, or one for each of the bulbs.

Having described several embodiments of my invention, the operation thereof is as follows: In Fig. 1, let it be assumed that the left-hand end of the filamentary cathode is temporarily at a positive potential with respect to the remainder thereof. Since the cathode member is heated by the passage of current therethrough and, consequently, electrons are being emitted from the surface thereof, a current will tend to flow from the anode 3 to the right-hand end of the cathode 4, this current being forced through the load circuit 6 by reason of the resistance drop in the portion 8 of the cathode. Upon reversal of the direction of current flow in the alternating-current mains 5, the other half wave will be rectified and the current will continue to flow through the direct-current load in the same direction as described in connection with the portion 8 of the cathode member, the resistance of the portion 7 now being effective in forcing the current through the load circuit.

Under some circumstances, it may be desirable to insure, beyond reasonable doubt, the improbability of a short-circuit occurring between the two extreme ends of the filament 4, this occurrence being possible in case a sudden high-voltage surge is impressed across the member 4. In the presence of the above-described conditions, the structure shown in Fig. 2 is especially desirable. Here, the anode member is of the plate type and, by its extension between the two portions of the cathode, constitutes a shield around which, or over which, it is extremely difficult for even a high voltage to cause a short-circuit.

An alternative construction to meet the conditions thus described is embodied in the structure of Fig. 3, wherein each of the portions of the filament is contained in a separate bulb. The extent to which this latter construction affords a safe-guard from the above difficulty is, of course, obvious.

It will be evident from the above description that, by connecting one terminal of the load circuit to a point intermediate the two ends of the filamentary cathode 4, I establish an artificial neutral point integral with the cathode itself and, moreover, that the cathode, by reason of its particular connection to the alternating-current-supply circuits and the direct-current-load circuit, is instrumental in rectifying both half waves of the alternating current impressed thereupon. Therefore, my invention embodies, in a single unit, in which a single anode is used, the operating characteristics which have heretofore been obtained only through the use of either a plurality of filamentary-cathode rectifiers, or by the employment of a vapor rectifier with which considerable auxiliary apparatus such, for instance, as leakage-reactance transformers, sustaining coils, and starting devices are necessary.

While I have shown a number of embodiments of my invention, it is obvious that many modifications therein may occur to those skilled in the art, and I desire, therefore, that only such limitations be placed thereon as are imposed by the prior art or are specifically set forth in the appended claims.

I claim as my invention:—

1. The combination with an alternating-current system, of a direct-current system, and converting means connecting said systems; said converting means including anode means connected to one terminal of said direct-current system, and a pair of hot-cathode elements connected in series across said alternating-current system and having their intermediate point connected to the other terminal of said direct-current system.

2. The combination with an alternating-current system, of a direct-current system having a voltage drop less than that of said alternating-current system, and converting means connecting said systems; said converting means including an electron-emitting cathode means of the type in which there is a continuous drop in potential along the entire length thereof, anode means for said cathode means, said anode means being connected to one terminal of said direct-current system, and said cathode means being connected across said alternating-current system and having a lead attached to said cathode at an intermediate point in the length thereof, said lead being connected to the other terminal of said direct-current system.

3. In combination with a source of alternating-current supply, a rectifying aggregate comprising a hot-cathode aggregate having two terminals connected to said alternating-current source, an anode member and a containing structure therefor, and a direct-current load having a voltage drop less than that of said source, one terminal of which is connected to said anode member and the other terminal of which is connected to said cathode aggregate at a point intermediate the terminals of said cathode aggregate.

4. In combination with a source of alternating-current supply, a rectifying aggregate comprising an anode member, an electron-emitting cathode aggregate having two terminals connected to said alternating-current source, and a containing structure for said aggregate, a direct-current load, and a lead connected to said aggregate at a point intermediate the terminals thereof, one terminal of said load being connected to said anode member and the other terminal thereof being connected to said lead.

5. In combination with a source of alternating-current, a rectifying aggregate comprising an anode, an electron-emitting filamentary-electrode aggregate comprising two portions disposed on opposite sides of said anode and having two end terminals and a common intermediate terminal, means for connecting said end terminals to said alternating-current source and a direct-current load connected between said anode and said common intermediate terminal.

6. In combination with a source of alternating-current, a rectifying aggregate comprising an anode, a filamentary electrode comprising two portions adapted to emit electron streams terminating on separate portions of said anode, respectively, said anode extending between said filamentary-electrode portions to substantially segregate said two electron streams, means for providing two end terminals and a common intermediate terminal for said filamentary-electrode portions, said end terminals being connected to said alternating-current source, and a direct-current load connected between said anode and said common intermediate terminal.

7. In combination with a source of alternating-current supply, a rectifying aggregate, comprising anode means, a cathode aggregate comprising electron-emitting elements having two terminals connected to said alternating-current source, a lead connected to a point on said electron-emitting elements which is disposed intermediate said end terminals and dividing said aggregate into two portions, a containing structure for said rectifying aggregate which operates to associate said anode means with each portion of said cathode aggregate, and a direct-current load connected between said lead and said anode means.

8. The combination with a rectifier bulb having filamentary cathode means and an anode, of a source of alternating current connected across said filamentary cathode means and a direct-current load having a voltage drop less than that of said source connected between said anode and a point upon said cathode means intermediate the terminals of the same.

9. The combination with an alternating-current source, of an impedance device connected thereacross, a direct-current translating device, said impedance device including means for providing an electron stream issuing alternately from different portions of said impedance device as one electrode and an electrode cooperating with said impedance device, said direct-current translating device being connected to said electrode and to said impedance device at a point intermediate said different portions.

10. In combination with a source of alternating-current supply, a rectifying aggregate comprising an anode member, an electron-emitting cathode means having end terminals connected to said alternating-current source, and a containing structure therefor, and a direct-current load having one terminal connected to said anode member and another terminal connected to a point upon said cathode means having a potential intermediate the potentials of said end terminals.

11. In a rectifying aggregate, the combination of an alternating-current electron-emitting cathode means of the type in which there is a continuous drop in potential along the entire length thereof, anode means for said cathode means, a direct-current load connected between said anode means and an intermediate point in the length of said cathode means and having a voltage drop less than the average value of the potential difference between the ends of said cathode means in its operative condition.

12. A rectifier comprising an enclosing bulb, an anode and a cathode having a continuous alternating-voltage drop from one end to the other thereof, and a load connected between the mid-point of said cathode and said anode, said alternating-voltage drop having a magnitude sufficient to cause a flow of electrons from said cathode to said anode.

In testimony whereof, I have hereunto subscribed my name this 17th day of Dec. 1918.

QUINCY A. BRACKETT.